United States Patent
Flaum et al.

(10) Patent No.: US 7,408,150 B1
(45) Date of Patent: Aug. 5, 2008

(54) WELL LOGGING METHOD FOR DETERMINING FORMATION CHARACTERISTICS USING PULSED NEUTRON CAPTURE MEASUREMENTS

(75) Inventors: Charles Flaum, Beijing (CN); Charles Franklin Morris, Jr., Missouri City, TX (US)

(73) Assignee: Schlumberger Technology Corporation, Cambridge, MA (US)

( * ) Notice: Subject to any disclaimer, the term of this patent is extended or adjusted under 35 U.S.C. 154(b) by 0 days.

(21) Appl. No.: 11/768,034

(22) Filed: Jun. 25, 2007

(51) Int. Cl.
*G01V 5/10* (2006.01)
(52) U.S. Cl. .................. 250/269.6; 250/269.8
(58) Field of Classification Search .............. 250/269.6, 250/269.7, 269.8
See application file for complete search history.

(56) References Cited

U.S. PATENT DOCUMENTS

| | | | |
|---|---|---|---|
| 4,721,853 A | 1/1988 | Wraight | |
| 5,291,137 A | 3/1994 | Freedman | |
| 5,699,246 A | 12/1997 | Plasek et al. | |
| RE36,012 E | 12/1998 | Loomis et al. | |
| 5,973,321 A | 10/1999 | Schmidt | |
| 6,703,606 B2 | 3/2004 | Adolph | |
| 7,073,378 B2 | 7/2006 | Smits et al. | |
| 2003/0006769 A1* | 1/2003 | Edwards | 324/303 |
| 2003/0009288 A1* | 1/2003 | Mickael | 702/8 |

OTHER PUBLICATIONS

Nelligan et al., "Accurate Thermal-Neutron Decay Time Measurements using the Far Detector of the Dual-Spacing TDT-A Laboratory Study", SPE 6156, pp. 59-66, Feb. 1979.

Steinman et al., "Dual-Burst Thermal Decay Time Logging Principles", SPE 15437, pp. 377-385, Jun. 1988.

Stoller et al., "Field Tests of a Slim Carbon/Oxygen Tool for Reservoir Saturation Monitoring", SPE 25375, pp. 481-487, 1993.

Plasek et al., "Improved Pulsed Neutron Capture Logging with Slim Carbon-Oxygen Tools: Methodology", SPE 30598, pp. 729-743, 1995.

Neuman et al., "An Investigation of Density Derived from Pulsed Neutron Capture Measurements", SPE 56647, pp. 1-8, Oct. 1999.

Freedman et al., "Processing of Data from an NMR Logging Tool", SPE 30560, pp. 301-316, 1995.

(Continued)

*Primary Examiner*—David P. Porta
*Assistant Examiner*—Mark R Gaworecki
(74) *Attorney, Agent, or Firm*—James McAleenan, Esq.; Vincent Loccisano, Esq.; Jody Lynn DeStefanis, Esq.

(57) ABSTRACT

A method for determining thermal capture cross-sections of formations surrounding an earth borehole, including the following steps: providing a logging device that is moveable through the borehole; transmitting, from the logging device, bursts of neutrons into the formations; detecting, at the logging device, resultant gamma ray counts, and deriving a measurement spectrum from the gamma ray counts; deriving a forward model comprising a combination of model exponential components having respective model decay times and model amplitudes; deriving an error function that depends on comparison between the forward model and the measurement spectrum; and determining, by regularized inversion, optimized exponential components of the model that substantially minimize the error function; the optimized exponential components being indicative of the thermal capture cross-sections of the formations.

30 Claims, 8 Drawing Sheets

OTHER PUBLICATIONS

Carr et al., "Effects of Diffusion on Free Precession in Nuclear Magnetic Resonance Experiments", Physical Review, vol. 94, No. 3, pp. 630-638, May 1, 1954.

Meiboom et al., "Modified Spin-Echo Method for Measuring Nuclear Relaxation Times", The Review of Scientific Instruments, vol. 29, No. 8, pp. 688-691, Aug. 1958.

Hall et al., A new Thermal Neutron Decay Logging System—TDT—M, SPE 9462, pp. 199-207, Jan. 1982.

Butler et al., "Estimating Solutions of first kind integral Equations with nonnegative constraints and optimal smoothing", Siam J. Number. Anal., vol. 18, No. 3, pp. 381-397, Jun. 1981.

Olesen et al., "Dual-Burst Thermal Decay Time Data Processing and Examples", SPWLA Twenty-Eight Annual Logging Symposium, Jun. 29-Jul. 2, 1987.

Scott et al., "LWD tool saves time and money", E&P, vol. 79, Issue 7, pp. 40-41, Jul. 2006.

Bauer et al., "Handbook for Automatic Computation", vol. 2, Linear Algebra, Chapter I/10, pp. 134-151, Springer-Verlag, 1971.

Dennis, Jr. et al., "Numerical Methods for Unconstrained Optimization and Nonlinear Equations", Chapter 6.3, pp. 116-129, Prentice-Hall, Inc., 1983.

Press et al., "Numerical Recipes. The Art of Scientific Computing", Chapter 2.9, Singular Valve Decomposition, pp. 52-64, Cambridge University Press, 1989.

Forsythe et al., "Computer Methods for Mathematical Computations", Chapter 9, Least Squares and the Singular Valve Decomposition, pp. 192-239, Prentice-Hall, Inc. 1977.

* cited by examiner

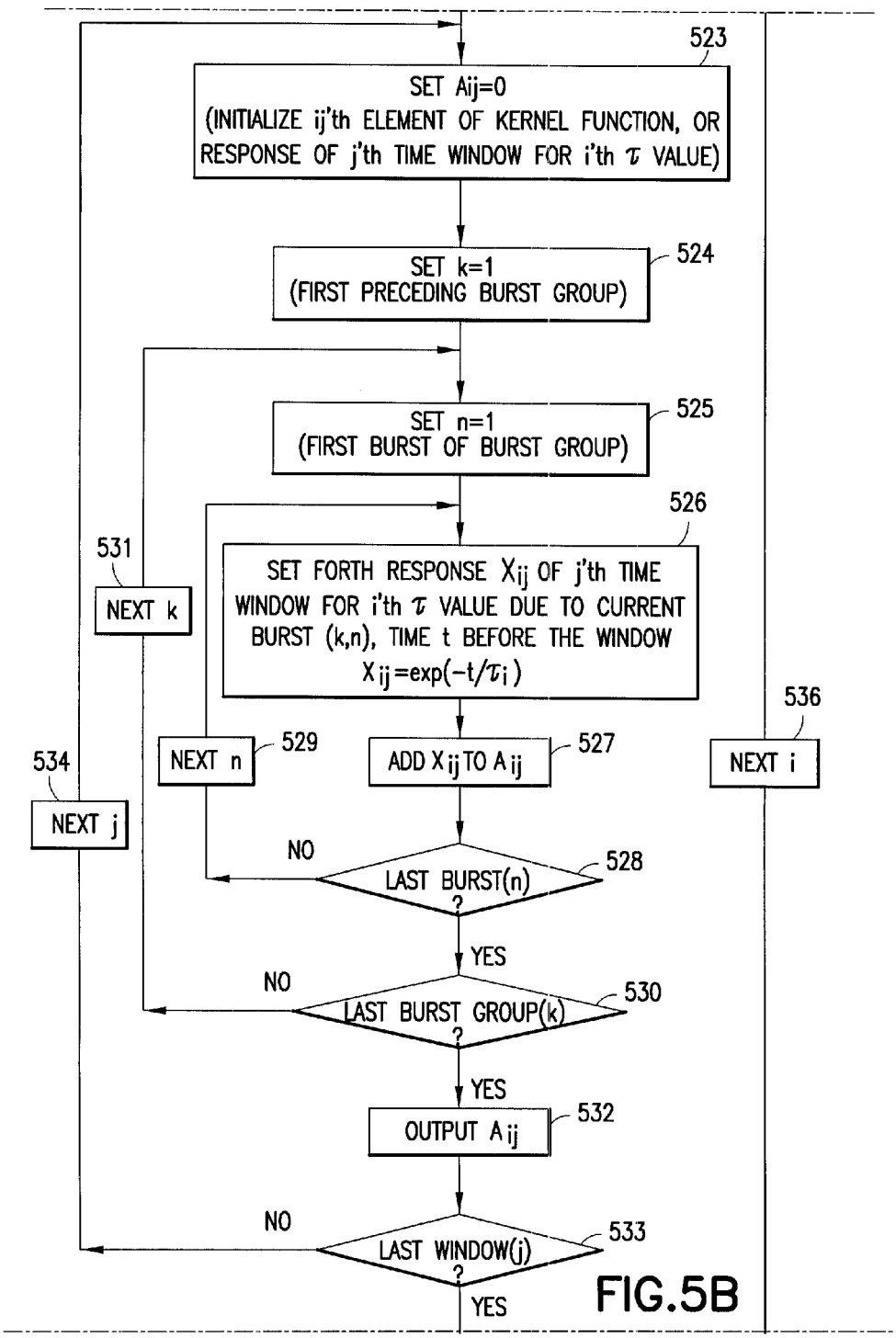

WELL LOGGING METHOD FOR DETERMINING FORMATION CHARACTERISTICS USING PULSED NEUTRON CAPTURE MEASUREMENTS

FIELD OF THE INVENTION

This invention relates to logging of formations surrounding an earth borehole and, more particularly, to techniques for determining characteristics of the formations using pulsed neutron capture measurements and extraction therefrom of thermal capture cross-sections.

BACKGROUND OF THE INVENTION

Thermal capture cross-section logging, or thermal neutron die-away logging, has been in use for decades to monitor the saturation history of a reservoir in cased holes. Macroscopic thermal capture cross-section, or $\Sigma$, is sensitive to the presence of strong thermal absorbers. Chlorine is one such absorber, and chlorine is commonly present in formation water, while not present in any hydrocarbons. Thus, $\Sigma$-logging can often be used to obtain water saturation. It is performed by irradiating the formation with pulsed neutron beams and by monitoring the returning gamma radiation, which results from the capture of thermal neutrons by highly-absorbing isotopes present in the formation, as a function of time between pulses.

$\Sigma$-logging had been performed using several generations of pulsed neutron logging tools, beginning with several generations of TDT's (Thermal Decay Tools), GST's (Gamma Spectroscopy Tools), and RST's (Reservoir Saturation Tools). Reference can be made, for example, to U.S. Pat. Nos. 4,721,853 and 5,699,246. More recently some open-hole tools have incorporated $\Sigma$-logging capability, such as APS (Accelerator Porosity Sonde) and, for logging while drilling, "Ecoscope" (mark of Schlumberger). Ecoscope is described, for example, in Scott, Weller, el-Haliwani, Tribe, Webb, Stoller, and Galvin, "LWD Tool Saves Time And Money," E & P July, 2006, and in U.S. Pat. No. 7,073,378. Experience with $\Sigma$ in open hole has shown that the measurement can be used effectively to measure $R_{XO}$ and/or clay content, as clays are also rich in various thermal absorbers.

Accurate $\Sigma$-logging presents a number of technical and physics problems, which inspired various changes in the acquisition hardware over the years. The main goal is to measure the decay time-constant of $\gamma$ radiation attenuation in the formation, by measuring the activity at various time intervals. The basic physics dictate that this decay be exponential in time. Because of strong contributions from the borehole fluids, casing, and the tool itself, the observed decay is far from a single exponential, and various schemes of acquisition have been developed to extract the needed information.

The early TDT tools, such as the dual-detector TDT-K, and its single detector predecessors, used three time gates (see W. B. Nelligan and S. Antkiew, Accurate Thermal-Neutron Decay Time Measurements Using Far Detector of the Dual-Spacing TDT—A Laboratory Study, SPE 6156, February 1979), where the latest gate was used to estimate and subtract activation background, and the ratio of the two earlier gates was used to estimate the decay rate. Large departure corrections needed to be applied to eliminate the borehole contamination and to correct for diffusion (that is, neutrons which diffuse out of the detection range or between different detection regions). A later version (see e.g. J. E. Hall et al, A New Thermal Neutron Decay Logging System—TDT-M, JPT, January 1982) TDT-M used a larger number of time windows (16) to decrease the sensitivity to the above effects, but with only limited success. The TDT-P which was an upgrade of the TDT-M, incorporated the dual-burst scheme, with the idea that the first, very short burst was dominated by the borehole, while the subsequent, longer burst was more affected by the formation (see e.g. D. K. Steinman, et al, Dual-Burst Thermal Decay Time Logging Principles, SPE 15437, SPE Formation Evaluation Journal, June 1988). The data were fitted to a two-exponential response model.

The results for the TDT-P were excellent where the fits were possible and of good quality, but in a number of situations (e.g. large fresh or oil-filled borehole) the fits were unstable and results not always useable.

A more recent generation of reservoir monitoring tools, the RST's incorporated a dual-burst scheme with a large number (126) of time-windows (see C. Stoller et al, Field Tests of a Slim Carbon/Oxygen Tool for Reservoir Saturation Monitoring, SPE 25375, February 1993). Instead of the dual exponential fitting, an empirical approach was used, relating moments of the time-based decay data related to a large laboratory (EECF) data base. This approach has been successful, as long as the logging situation is within the span of the EECF data base.

Application of $\Sigma$-logging in open hole presents some special problems. In a cased hole, the presence of casing, which is strongly absorbing (iron has a large thermal capture cross-section), and commonly used saline completion fluid, causes the borehole signal to decay much faster than the formation, so at later times the formation signal can be cleanly observed. By contrast, in open hole, especially in fresh muds, separation of the borehole and formation signals can be much more difficult.

The most recent entry in obtaining Open Hole $\Sigma$ measurement, first referenced above, is the Ecoscope while-drilling tool, which measures $\Sigma$ in addition to the more conventional evaluation measurement such as bulk density, neutron porosity and formation resistivity. Because of the inherent problem with separation the borehole and formation signals in open hole, the Ecoscope incorporates a complex pulsing scheme, using short neutron bursts to try to look at the borehole signals, and grouping sets of these with looking at later time to see the formation signal.

The U.S. Pat. No. 5,973,321 discloses a method for determining the fractional amounts of, and the thermal neutron capture cross-sections of, individual components which are included in the decay spectrum measured by a pulsed neutron well logging instrument. The method includes generating a data kernel which is made up of "representors" of decay components of the wellbore and of the earth formations in the vicinity of the instrument. The decay spectrum measured by the instrument is inverted in an attempt to determine parameters by which the representors are scaled so that, in combination, the scaled representors most closely match the measured decay spectrum. The parameters represent the fractional amounts of each exponential decay component which makes up the measured exponential decay spectrum. Gamma rays detected by the logging instrument are segregated into about 100 discrete short interval time windows called gates, with each gate corresponding to a different time interval after the end of each of a number of neutron bursts.

In the technique of the '321 patent, the time value for a gamma ray counting rate associated with each gate is stated to be preferably assigned to the midpoint of the time span for each gate (called the "center time" for each gate). Also in the technique of the '321 patent, each representor has a single value of exponential decay rate $\tau$, and it is indicated that the number of values of τ used to generate the data kernel is preferably not greater than the number of gates in the measured data.

In some circumstances, the type of approach suggested in the referenced '321 patent may provide useful output. However, the type of approach suggested in the '321 patent has certain limitations and drawbacks. One example is the suggestion that the number of representors of exponential decay rate in the data kernel should not be greater than the number of gates in the measured data. Another example is the assignment of a single time, i.e. the midpoint, for each time window. These and other aspects of the approach of the '321 patent would limit the usefulness of the '321 technique, especially if one attempted to use the '321 technique in a complex pulsing/acquisition scheme.

It is among the objects of the present invention to provide improved techniques for accurate determination of thermal capture cross sections of formations surrounding an earth borehole.

SUMMARY OF THE INVENTION

One of the features of the present invention involves use of regularization in an inversion to obtain optimized exponential components of a forward model. An advantage of regularization is that it allows for fitting of many sigma (capture cross section) values, substantially more than the number of windows or gates, while maintaining a repeatable smooth behavior. Without regularization one would have two choices, neither giving reliable results: (1) one can use many sigma values and obtain a very noisy, poorly repeatable result; or (2) one can use only a few values of sigma with poor likelihood that some of these are actual sigmas of the problem. If few or none of the values chosen are close to a true values, the fit will be poor and generate unphysical amplitudes at other sigma values.

In accordance with an embodiment of the invention, a method is provided for determining thermal capture cross-sections (it being implicit, throughout, that the reciprocal, the intrinsic thermal decay times, can be the determined parameter) of formations surrounding an earth borehole, including the following steps: transmitting, from a location in the borehole, bursts of neutrons into the formations; detecting, in the borehole, resultant gamma ray counts, and deriving a measurement spectrum from the gamma ray counts; deriving a forward model comprising a combination of model exponential components having respective model decay times and model amplitudes; deriving an error function that depends on comparison between the forward model and the measurement spectrum; and determining, by regularized inversion, optimized exponential components of the model that substantially minimize the error function; the optimized exponential components being indicative of the thermal capture cross-sections of the formations.

In a preferred embodiment of the invention, the optimized exponential components comprise optimized amplitudes for selected decay times. In this embodiment, the detecting of gamma ray counts comprises detecting counts within a number of time windows, and the number of said model exponential components can be substantially greater than said number of time windows. Also in this embodiment, the regularized inversion comprises an inversion with a penalty added to the error function for variation of the model amplitudes. In a form of this embodiment, the regularized inversion comprises a regularized least squares inversion with a penalty added to the error function that is proportional to the sum of squares of said model amplitudes, the penalty being applied to the error function with a varying proportionality constant.

In an embodiment of the invention, a method is set forth for determining thermal capture cross-sections of formations surrounding an earth borehole, including the following steps: providing a logging device that is moveable through the borehole; transmitting, from the logging device, bursts of neutrons into the formations; detecting, at the logging device, resultant gamma ray counts, and deriving a measurement spectrum from the gamma ray counts; deriving a forward model comprising a combination of model exponential components having respective model decay times and model amplitudes; deriving an error function that depends on comparison between the forward model and the measurement spectrum; and determining, by regularized inversion, optimized exponential components of the model that substantially minimize the error function; the optimized exponential components being indicative of the thermal capture cross-sections of the formations. A form of this embodiment comprises repeating the recited method with the logging device at different depth levels in the borehole, and producing a log of determined capture cross-section values. The logging device can be, for example, a wireline logging device or a logging-while-drilling logging device.

Further features and advantages of the invention will become more readily apparent from the following detailed description when taken in conjunction with the accompanying drawings.

DETAILED DESCRIPTION

Figure 1:
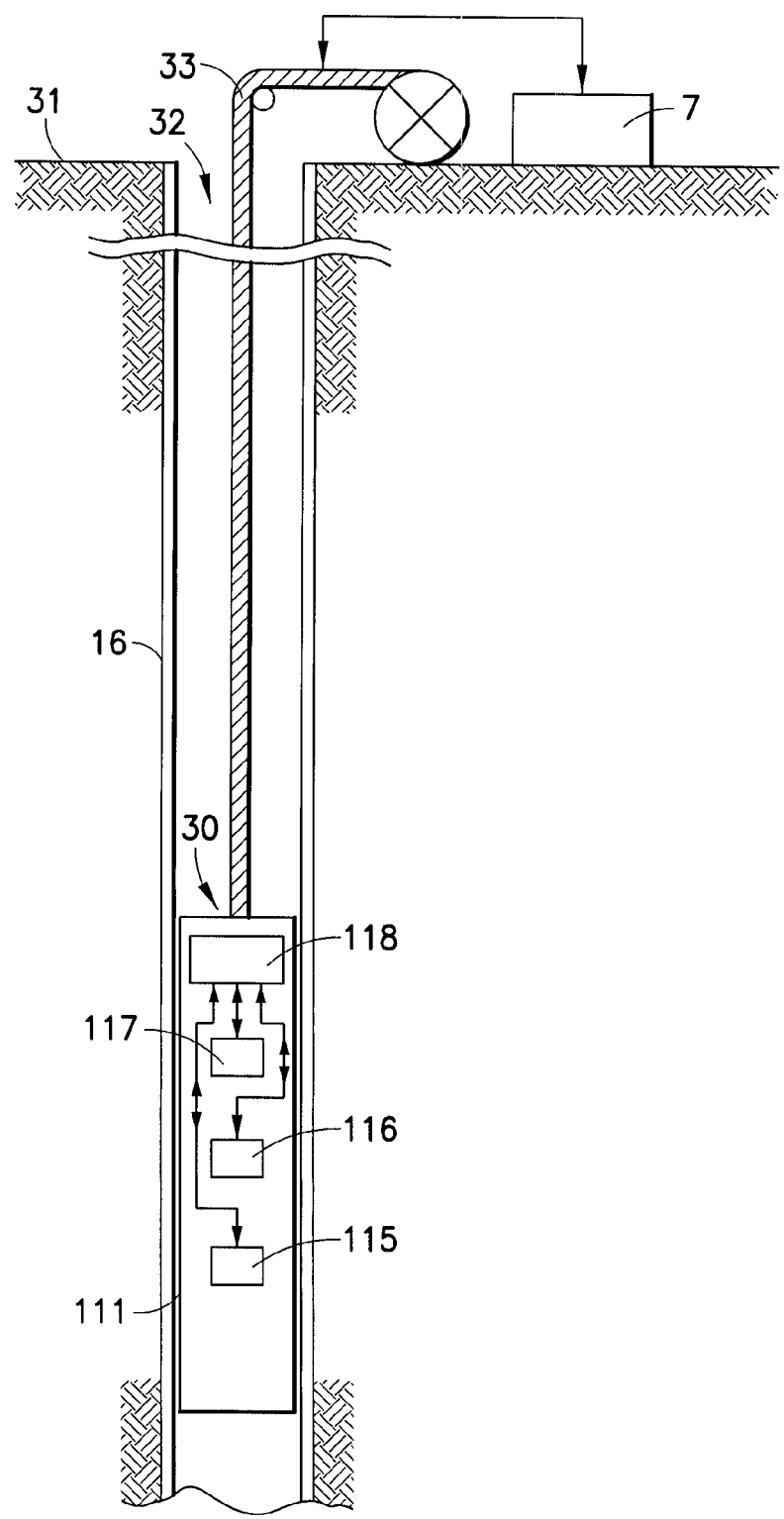
FIG. 1 is a diagram, partially in block form, of a type of wireline logging system that can be used in practicing embodiments of the invention.

Referring to FIG. 1, there is shown an apparatus for investigating subsurface formations 31 traversed by a borehole 32, which can be used in practicing embodiments of the invention. The borehole 32 is typically, but not necessarily filled with a drilling fluid or mud which contains finely divided solids in suspension, and mudcake 16 is shown on the walls of the borehole.

A pulsed neutron capture investigating apparatus or logging device 30 is suspended in the borehole 32 on an armored cable 33, the length of which substantially determines the relative depth of the device 30. As is known in the art, this type of device can also operate in a well having casing or tubing. The length of cable 33 is controlled by suitable means at the surface such as a drum and winch mechanism (not shown). The depth of the tool within the well bore can be measured by encoders in an associated sheave wheel, the double-headed arrow representing communication of the depth level information to the surface equipment. Surface equipment, represented at 7, can be of conventional type, and can include a processor subsystem and recorder, and communicates with the all the downhole equipment. It will be understood that processing can be performed downhole and/or uphole, and that some of the processing may be performed at a remote location. Although the tool 30 is shown as a single body, the tool may alternatively comprise separate components such as a cartridge, sonde or skid, and the tool may be combinable with other logging tools.

The pulsed neutron capture logging device 30 of the FIG. 1 may, in a form hereof, be of a general type described for example, in U.S. Pat. No. 5,699,246. The logging device of FIG. 1 includes a housing 111 in the shape of a cylindrical sleeve, which is capable, for example, of running an open borehole or production tubing. Although not illustrated in FIG. 1, the sonde 30 may also have an eccentering device, for forcing the tool against the wall of an open hole or against well casing. At least one accelerator or pulsed neutron source 115 is mounted in the sonde with near detector 116 and far detector 117 mounted longitudinally above the accelerator 115, with increasing axial distances. One or more further detectors (not shown) can also be provided, it being understood that when the near and far detectors are referenced, use of further detectors can, whenever suitable, be employed as well. Also, it can be noted that a single detector could be used. Acquisition, control, and telemetry electronics 118 serves among other functions, to control the timing of burst cycles of the neutron accelerator 115, the timing of detection time gates for near and far detectors 116, 117 and to telemeter count rate and other data via cable 33 and uphole telemetry circuitry, which can be part of surface instrumentation 7. The surface processor of surface equipment 7 can, for example, receive gamma ray spectral data from near and far detectors 116 and 117. The signal can be recorded as a log as a function of depth on, for example, a recorder in the surface equipment 7. As described, for example, in the U.S. Pat. No. 5,699,246, the tool can be used in tubing in the well bore, which typically is lined with steel casing and cemented in place. A well head (not shown) at the earth's surface can communicate with tubing. As described in the referenced U.S. Pat. No. 5,699,246, one prior method of measuring decay times is the so-called Dual-Burst thermal decay logging method. In this method, a neutron burst sequence is provided which includes two bursts designated as a short burst and a long burst. A first short time burst of fast neutrons is provided at a location in the borehole thereby irradiating borehole materials and the earth formation adjacent to that borehole location. The gamma ray intensity indicative of the concentration of thermal neutrons in the formation and borehole materials is measured after the short burst. Next, a relatively long time burst of fast neutrons is applied at substantially the same locations within the borehole thereby again irradiating the borehole materials and the earth formation adjacent the borehole location. It will be understood that the present invention has application to various techniques for obtaining the capture gamma ray spectrum data, but the invention is particularly advantageous for use in conjunction with relatively complex pulsing schemes, as described, for example, hereinbelow.

The invention can also be practiced, for example, using logging-while-drilling equipment. As shown, for example, in FIG. 2, a platform and derrick 210 are positioned over a borehole 212 that is formed in the earth by rotary drilling. A drill string 214 is suspended within the borehole and includes a drill bit 216 attached thereto and rotated by a rotating table 218 (energized by means not shown) which engages a Kelly 220 at the upper end of the drill string. The drill string is suspended from a hook 222 attached to a traveling block (not shown). The Kelly is connected to the hook through a rotary swivel 224 which permits rotation of the drill string relative to the hook. Alternatively, the drill string 214 and drill bit 216 may be rotated from the surface by a "top drive" type of drilling rig.

Drilling fluid or mud 226 is contained in a mud pit 228 adjacent to the derrick 210. A pump 230 pumps the drilling fluid into the drill string via a port in the swivel 224 to flow downward (as indicated by the flow arrow 232) through the center of drill string 214. The drilling fluid exits the drill string via ports in the drill bit 216 and then circulates upward in the annulus between the outside of the drill string and the periphery of the borehole, as indicated by the flow arrows 234. The drilling fluid thereby lubricates the bit and carries formation cuttings to the surface of the earth. At the surface, the drilling fluid is returned to the mud pit 228 for recirculation. If desired, a directional drilling assembly (not shown) could also be employed.

Mounted within the drill string 214, preferably near the drill bit 216, is a bottom hole assembly (indicated generally by the reference numeral 236), which includes subassemblies for making measurements, processing and storing information and for communicating with the earth's surface. The bottom hole assembly is typically located within several drill collar lengths of the drill bit 216. In the illustrated bottom hole arrangement of FIG. 2, a stabilizer collar section 238 is shown immediately above the drill bit 216, followed in the upward direction by a drill collar section 240, another stabilizer collar section 242 and another drill collar section 244. This arrangement of drill collars and stabilizer collars is illustrative only, and other arrangements may of course be used. The need for or desirability of the stabilizer collars will depend on drilling conditions.

Figure 2:
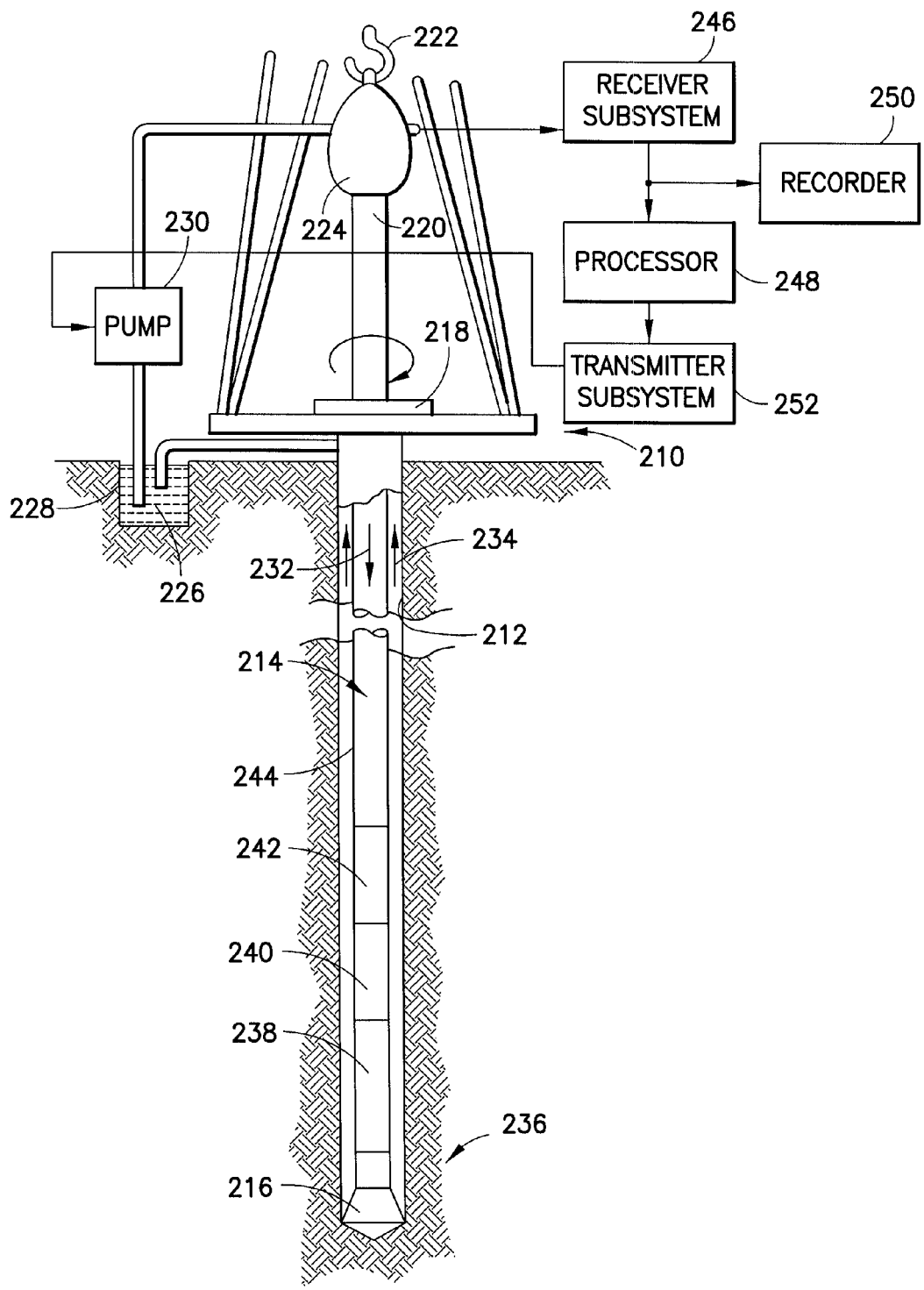
FIG. 2 is a diagram, partially in block form, of a type of logging-while-drilling system that can be used in practicing embodiments of the invention.

In the arrangement shown in FIG. 2, the components of a downhole pulsed neutron measurement subassembly can typically be located in the drill collar section 240 above the stabilizer collar 238. Such components could, if desired, be located closer to or farther from the drill bit 216, such as, for example, in either stabilizer collar section 238 or 242 or the drill collar section 244.

The bottom hole assembly 236 also includes a telemetry subassembly (not shown) for data and control communication with the earth's surface. Such apparatus may be of any suitable type, e.g., a mud pulse (pressure or acoustic) telemetry system, wired drill pipe, etc., which receives output signals from the data measuring sensors and transmits encoded signals representative of such outputs to the surface where the signals are detected, decoded in a receiver subsystem 246, and applied to a processor 248 and/or a recorder 250. The processor 248 may comprise, for example, a suitably programmed general or special purpose processor. A surface transmitter subsystem 252 may also be provided for establishing downward communication with the bottom hole assembly.

The bottom hole assembly 236 can also include conventional acquisition and processing electronics (not shown) comprising a microprocessor system (with associated memory, clock and timing circuitry, and interface circuitry) capable of timing the operation of the accelerator and the data measuring sensors, storing data from the measuring sensors, processing the data and storing the results, and coupling any desired portion of the data to the telemetry components for transmission to the surface. Alternatively, the data may be stored downhole and retrieved at the surface upon removal of the drill string. Power for the downhole electronics may be provided by battery or, as known in the art, by a downhole turbine generator powered by the drilling fluid.

Figure 3:
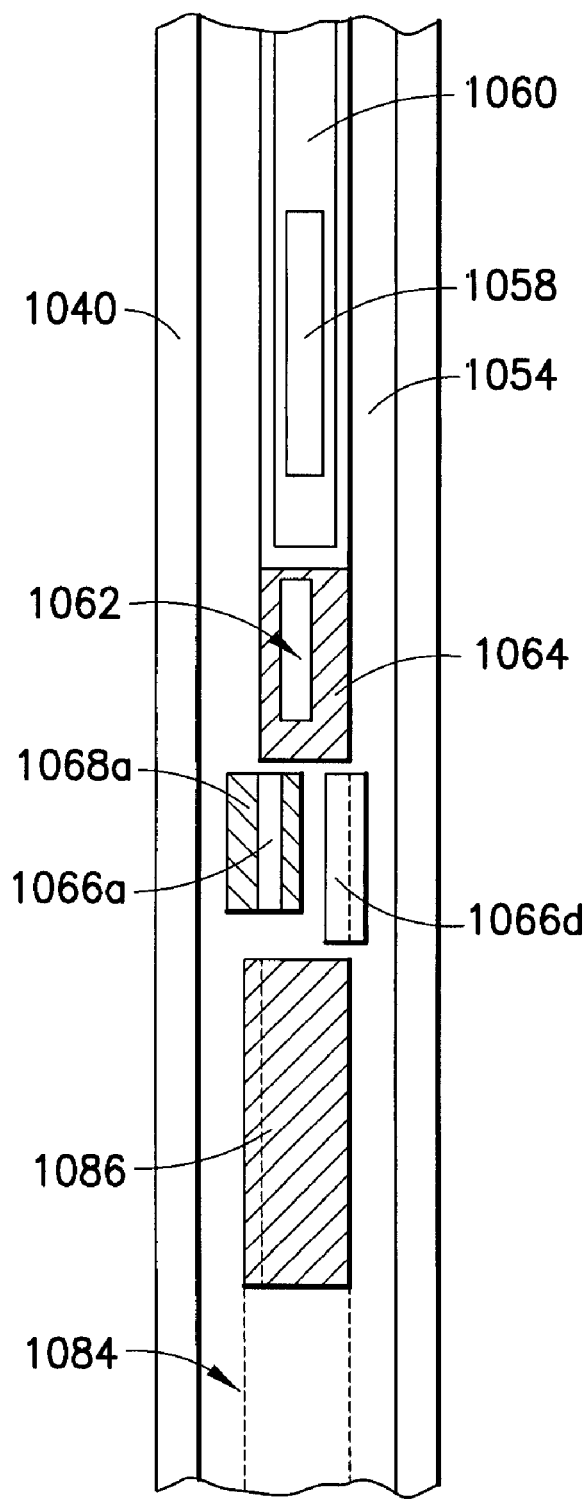
FIG. 3 is a cross-sectional view of a type of logging device that can be used in the system of FIG. 2.

FIG. 3 is a diagram of a type of logging-while drilling device disclosed in U.S. Patent Re. 36,012, and which can be used to obtain pulsed neutron capture measurements. In FIG. 3, a drill collar section 1040 is shown as surrounding a stainless steel tool chassis 1054. Formed in the chassis 1054 to one side of the longitudinal axis thereof (not visible in this view) is a longitudinally extending mud channel for conveying the drilling fluid downward through the drill string. Eccentered to the other side of the chassis 1054 are a neutron accelerator 1058, its associated control and high voltage electronics package 1060 and a coaxially aligned near-spaced detector 1062. The near-spaced detector 1062 is primarily responsive to accelerator output with minimum formation influence. The detector 1062 is surrounded, preferably on all surfaces except that adjacent to the accelerator 1058, by a shield 1064 of combined neutron moderating-neutron absorbing material. The output of the near detector 1062 is used to normalize other detector outputs for source strength fluctuation. Located longitudinally adjacent to the near-spaced detector 1062 is a plurality or array of detectors, of which 1066*a* and 1066*d* are shown in this view. The detector 1066*a* is back-shielded, as shown at 1068*a*. The array includes at least one, and preferably more than one, epithermal neutron detector and at least one gamma ray detector, represented in this example at 1084, with shield 1086 and a plurality of thermal neutron detectors. The above-referenced U.S. Patent Re. 36,012 can be referred to for further details.

Figure 4:
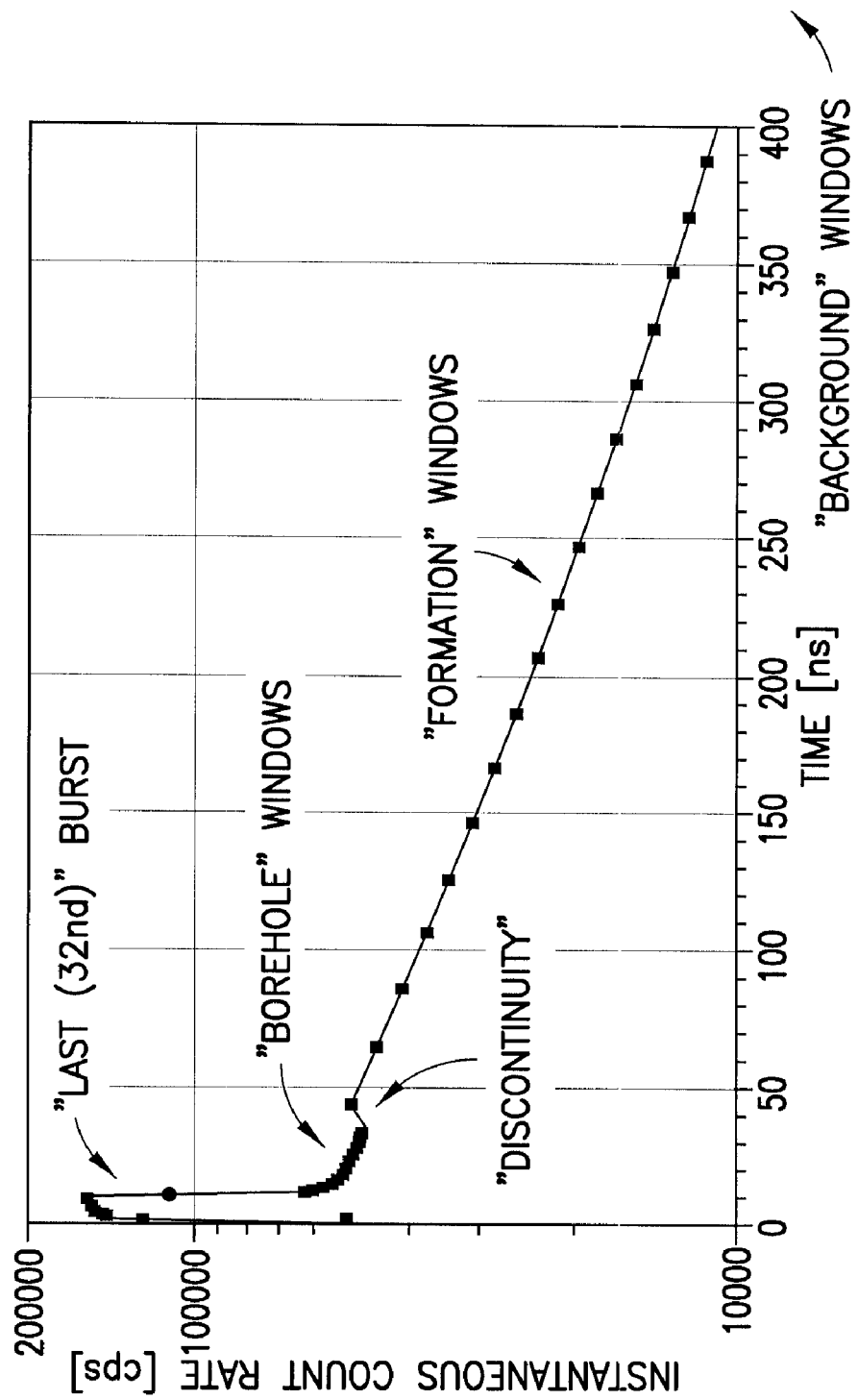
FIG. 4 is a graph of instantaneous gamma decay count rate as a function of time for an existing pulsed neutron capture logging device.

As first referenced in the Background portion hereof, a recent entry in obtaining open hole Σ measurements is the Ecoscope while-drilling tool, which measures Σ in addition to the more conventional evaluation measurement such as bulk density, neutron porosity and formation resistivity. Because of the inherent problem with separation of the borehole and formation signals in open hole, the Ecoscope incorporates a complex pulsing scheme, using short neutron bursts to try to look at the borehole signals, and grouping sets of these with looking at later time to see the formation signal. [Ecoscope is described, for example, in Scott, Weller, el-Haliwani, Tribe, Webb, Stoller, and Galvin, "LWD Tool Saves Time And Money," E & P July, 2006, and in U.S. Pat. No. 7,073,378.] The pulsing scheme also includes very late-time windows to estimate activation background. The complexity precludes an approach that involves a one-, two-, or ever three-exponential fit to the data. The observed data points are discontinuous even when effects of duty factor are taken into account. A typical observed decay, not including the background windows, is shown in FIG. 4. The discontinuity between the "borehole" and "formation" windows is well explained by the details of the pulsing scheme, but it makes it difficult to write an explicit inversion equation for the formation decay.

An existing technique to obtain formation Σ ignores the early "borehole" windows and uses most of the "formation" windows in an empirical "moments" approach. The approach requires large corrections for borehole contamination and diffusion and even after the correction, the results are not always satisfactory. The results tend to be poor in low Σ range, and the borehole corrections that are needed are significant, and sometimes unreliable. It is believed that the main cause of poor results is the variable effect of borehole contamination that cannot be accounted for in a simple empirical approach. A multi-exponential fit would be expected to do better, but, it would be difficult to implement where the pulsing scheme is complex. The technique of an embodiment hereof provides good results, even for a very complex pulsing scheme.

The exemplary pulsing sequence hereof consists of 62 groups of 32 bursts with variously-timed windows in between and following. First, it is noted that each window can, in principle, be affected by all the preceding bursts, up to 1984 of them. The forward model (or kernel function) needs to take that into account. Secondly, the noise for each window can be very different (nuclear count rate statistics). Thirdly, there are three types of windows; namely, "borehole", "formation", and "background" (see FIG. 4), and they have different widths, time spacings and repeat cycles. Their contributions to the data kernel K will be quite different. Furthermore, the "formation", and especially the "background" windows are quite wide in time, so one cannot assign single time values for these. Their kernel function contributions need to be replaced by the integrals over the window time span. Fortunately, for exponential functions, this is not a difficult problem.

The exemplary pulsing scheme results in the following data kernel function:

$$K_{ij} = \sum_{k=1:62}\sum_{n=1:k}\sum_{l=1:32}\sum_{m=1:l} e^{-[t_i+(m-1)*tb+(n-1)*tg/\tau_j]} / (62*32*\sigma_i) \quad (1)$$

$i <= 34$ borehole windows $$K_{ij} = \sum_{k=1:62}\sum_{n=1:k}\sum_{l=1:32} e^{-[t_i+(l-1)*tb+(n-1)*tg/\tau_j]} / (62*\sigma_i)$$

$i > 34$ formation windows where tb represents the time between bursts, and tg represents the time between burst groups. Note that the inversion is for τ the decay time, not Σ. The two are related by the trivial formula $$\tau = 4545 1/\tau \quad (2)$$

and are considered interchangeably for descriptive purposes hereof. The difference between the "borehole" window response and the rest is the fact that for each 1500 microsecond sub-sequence, the borehole windows are averages over those following each of 32 bursts, where the first one sees only one, whereas the 32$^{nd}$ sees all 32 bursts. The formation windows see all 32 bursts of the sub-sequence. This is the cause for the discontinuity seen in FIG. 4. Note also that eq. (1) does not account for the finite window widths which require replacing the exponentials by their integrals. The "borehole" summations in eq. (1), contain over 1,000,000 steps for each window. This can involve very time consuming computation. The summation can be greatly reduced by remembering that each sigma packet, for example, is 1.5 msec long. This means that even for a lowest Σ of 5 CU, the decay from the bursts of one packet is down by an order of magnitude by the time one looks at the windows of the following packet. The contribution of the bursts of one packet to the windows of the fifth packet following can be completely ignored. This means that the n summation in eq. (1) does not need to be done over all n, but only for n<=5. Furthermore, since max(n)=5 <<62, it can be assumed that the summation over k is not needed as all the terms are the same. This is not exactly true for k<5, but the error is negligible. This means that summations in eq. (1) can be reduced to $$K_{ij} = \sum_{n=1:npr}\sum_{l=1:32}\sum_{m=1:l} e^{-[t_i+(m-1)*tb+(n-1)*tg/\tau_j]} / (32*\sigma_i) \quad (3)$$

-continued $i <= 34$ borehole windows $$K_{ij} = \sum_{n=1:npr}\sum_{l=1:32} e^{-[t_i+(l-1)*tb+(n-1)*tg/\tau_j]}/(\sigma_i)$$

$i > 34$ formation windows where npr=5. This reduces the computation time by almost three orders of magnitude.

Before applying the described method to the exemplary data set, several parameters will be defined. Care should be taken in selecting which windows to actually include in the computation. The kernel function of eq.s (1) or (3) does not properly describe all the windows. The early borehole windows are much affected by the presence of fast neutrons, generating inelastic γ rays, and other neutron interference in the detector. For this reason, the first 28 borehole windows are ignored.

For a particular exemplary pulsing pattern, the background windows contain very few useful counts. Even though their weight is low due to large statistical error, they have a very large contribution to the fit due to the long moment arm of the window. Usually, only one or two of the background windows appear to contain useful counts above background. An example of the fitting procedure includes only the first background window, and only if its amplitude was more that 1% of that of the first formation window. However, in other cases the background windows may contain useful data, and they can be readily included in the kernel function using the method hereof. If desired, one can choose to include any number of the background windows, since the ones that have no useful data will not necessarily degrade the fit quality. One can also use all the background windows and add a background term to the kernel function so that the fit also finds the background level itself.

For this example, the range of τ values can be chosen to be 10-1000 μsec, corresponding to Σ range of 4.545-454.5 CU. This is expected to generally cover all situations of interest. In order to get adequate resolution in τ (and τ), 100 τ values were used in this example. The regularization coefficient γ was chosen to be 1e–7 for Σ<=15, and 1e–8 for Σ>15. This was determined by observation. The maximum number of singular components was taken to be 8. Results of the example have demonstrated substantial improvement over the prior art "moments" method and over inversion techniques without regularization.

Figure 5A:
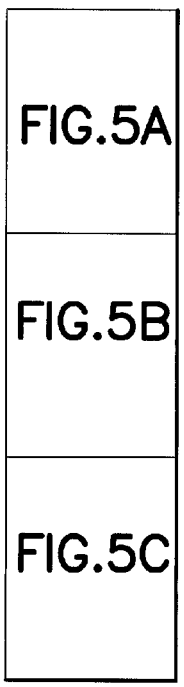
FIG. 5, which includes FIGS. 5A, 5B, and 5C placed one below another, is a flow diagram of a routine that can be used for controlling a processor or processors in practicing an embodiment of the invention.
Figure 5A:
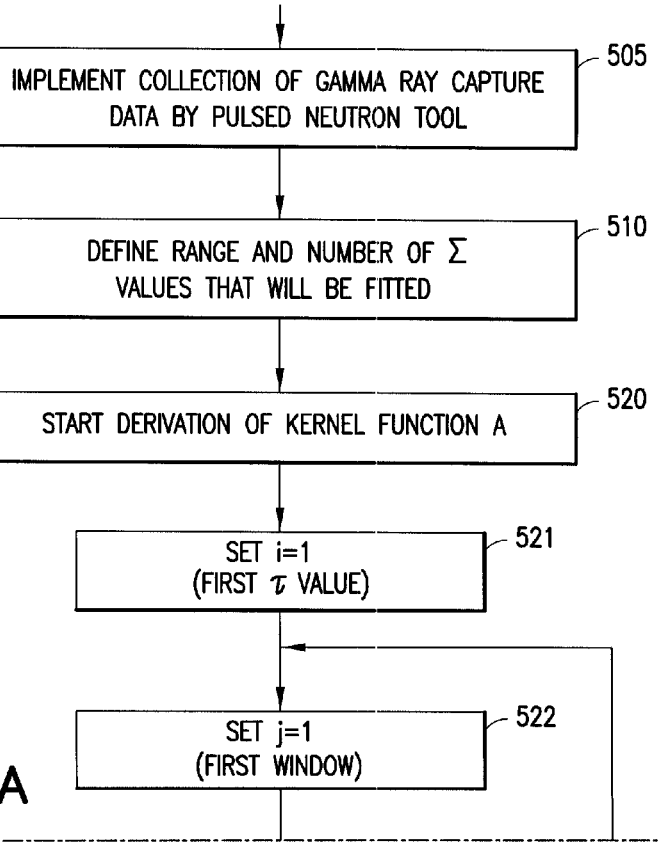
Figure 5C:
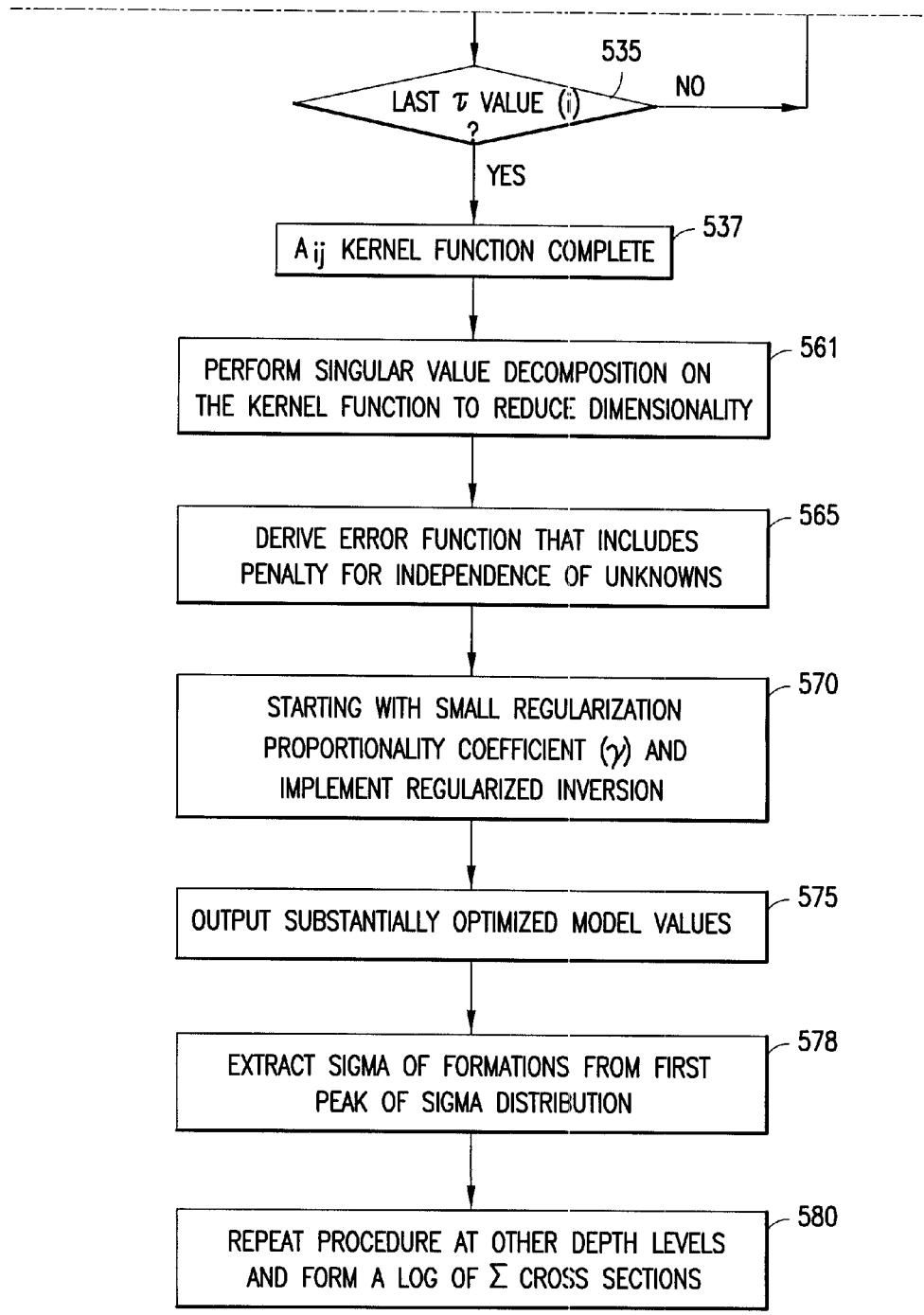

FIG. 5 is a flow diagram of a routine for controlling downhole and/or uphole processors in practicing embodiments of the invention. The block 505 represents implementing of the collecting of gamma ray capture counts by a pulsed neutron logging tool, such as the type of tool described above. Bursts of pulsed neutrons are transmitted into the formations, gamma ray counts are detected, such as in the described time windows, and a gamma ray count spectrum is produced, all as known in the art, or by any suitable technique. The block 510 represents defining the range and number of sigma values (or characteristic exponential decay times) that will be fitted. The next portion of the routine, which includes blocks 520-537, represents the deriving of a forward model or kernel function, consistent with the previous description.

In blocks 521 and 522 the indices over τ value, i, and window number, j, are initialized, and in block 523 the specific matrix element $A_{ij}$ of the kernel function matrix is initialized to 0. Next, in blocks 524 and 525 the indices over burst group, k, and burst within each group, n, are initialized. Then in block 526 we compute the contribution to $A_{ij}$ from the specific burst defined by the indices k and n. Actual computation should involve integration over window width and burst width $$A_j = \int_{t_{jo}}^{t_{jo}+w_b} \int_{t_j}^{t_j+w_j} \exp(-t/\tau_i)\,dt\,dt_j$$

where $w_b$ and $w_j$ are the j'th window width (in time) and the burst width, respectively, and $t_{jo}$ is the time between the beginning of the specific burst and the beginning of the j'th window. The time t=0 is defined here as the time of the beginning of the specific burst. The index i of the specific window is implied.

Since the integral of an exponential function is another exponential function, the above double integral can be replaced by a sum of four exponentials:

$$A_{ji}=\tau_i^2[\exp(-t_{jo}/\tau_i)-\exp(-(t_{jo}+w_b)/\tau_i)-\exp(-(t_{jo}+w_j)/\tau_i)+\exp(-(t_{jo}+w_j+w_b)/\tau_i)]$$

In block 527 we add the contribution of the specific burst to the accumulated sum Aij, and then we check in block 528 if this was the last burst in the current group. If not, we go to the next burst by incrementing the burst index n (block 529) and return to block 526 to compute its contribution to Aij. If the last burst of the group is included, then we check, in block 530 if this was the last group that needs to be included. If not, we increment the group index k (block 531) and go back to block 525 to reinitialize the burst index and continue repeating the process for this next group, in blocks 526-529.

After completing the last group (yes branch in block 530), we have completed the computation of the specific matrix element $A_{ij}$ of the kernel function, and go on to compute the other matrix elements by incrementing the window and τ indices j and i, as shown in blocks 533-536, and repeating the process in blocks 523-532. At the end of this portion of the routine, having reached the last window index and last τ index, the kernel function A is complete, as represented in block 537.

The foregoing type of routine can be applied to any suitable generalized pulsing sequence, independent of the frequency and widths of the bursts, the positions and widths of the time windows, or burst groupings. The only limitation is a physics one, the time $(t_{jo}-w_b)$ must be long enough for all fast and epithermal neutrons to die away. This is typically a few microseconds. In setting out this process, it is important to include all the bursts within the time before the particular window over which the decay of gamma ray activity is non-negligible. For a minimum value of Sigma of 5 CU, which is the smallest expected to be found in nature, this corresponds to a maximum time of about 5 milliseconds. Bursts occurring at a time earlier than 5 msec before the window ($t_{jo}>5$ msec) will not contribute to that window.

In the next portion of the routine of FIG. 5, regularized inversion is implemented to obtain the exponential component amplitudes, $a_i$. The block 561 represents the performing of singular value decomposition on the forward model (Kernal function), to reduce dimensionality. As represented by block 565, an error function is derived, the error function including a penalty term constraining the variation of the model amplitudes, the purpose of the penalty term being to reduce the solution space by reducing the independence of the unknowns (i.e., the $a_i$ values). A preferred penalty term is proportional to the sum of the squares of the amplitudes $a_i$, resulting in a preference for solutions that are smoothest in τ space (or sigma space). The preferred choice of the proportionality constant is the maximum value for which the error function still satisfies the standard error criterion (normalized $X^2$ is around 1). As first noted above, an advantage of regularization is that it allows for fitting of many sigma (capture cross section) values, substantially more than the number of windows or gates, while maintaining a repeatable smooth behavior. Without regularization one would have two choices, neither giving reliable results: (1) one can use many sigma values and obtain a very noisy, poorly repeatable result; or (2) one can use only a few values of sigma with poor likelihood that some of these are actual sigmas of the problem. If few or none of the values chosen are close to a true values, the fit will be poor and generate unphysical amplitudes at other sigma values. The block 570 represents implementing of the described regularized inversion, using, for example, a Butler-Reeds-Dawson ("BRD") approach. (Reference can be made to J. P. Butler, J. A. Reeds, and S. V. Dawson, "Estimating Solutions Of First Kind Integral Equations With Non-Negative Constraints And Optimal Smoothing", SIAM Journal of Numerical Analysis 18:381-397, 1981.) The procedure can start with an arbitrarily small regularization proportionality coefficient (γ). The value of γ can gradually be increased while observing the resulting error function $X^2$, and fixed when $X^2$ starts increasing over the statistically expected value (1 for normalized $X^2$). Alternatively, this step can be replaced by predetermining γ from known correlations with measurement errors. The determined optimized model values of amplitudes $a_i$ are read out, as represented by the block 575. The block 578 represents extraction of the formation sigma by determining, along the sigma axis, the first, or lowest sigma, significant peak of the sigma distribution (see also FIG. 6 below). Optionally, other components (e.g. tool/borehole component—again, see FIG. 6) can be extracted from subsequent peaks. Then, the block 580 represents repeating the procedure at other depth levels of the logging device, and forming a log of determined sigma cross-sections.

Figure 6:
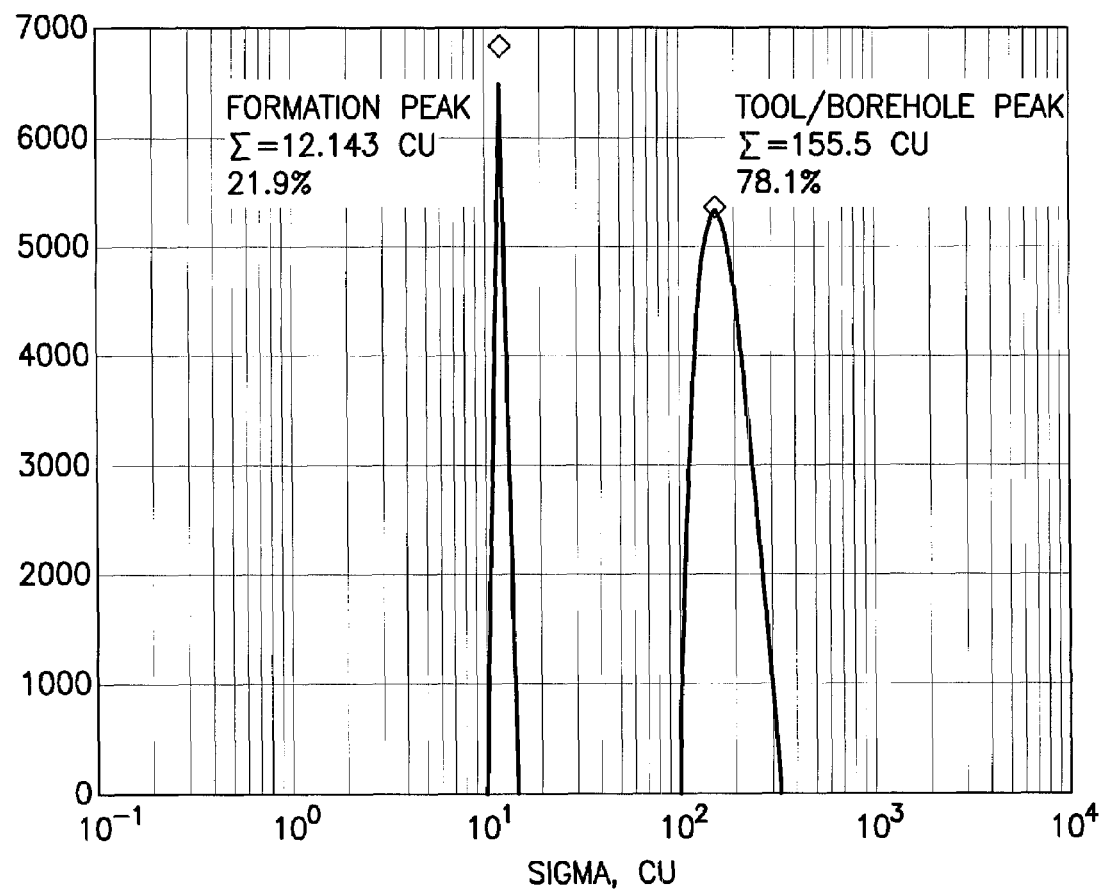
FIG. 6 is a graph of an exemplary sigma distribution as obtained using an embodiment of the invention.

FIG. 6 shows an example of a typical type of sigma distribution obtained using an embodiment of the invention. It is seen that the formation contribution (having a peak at Σ=12.121 CU in this example) and the tool/borehole contribution (having a peak at Σ=154.32 CU in this example) are clearly separated. This is typical, except when Σ value approaches 20 CU or more. The formation contribution to the signal (indicated by percentage of area under the left curve) is a small fraction of the total, it being less than 10 percent in same cases. For this reason, prior art approaches can have difficulty in some cases in eliminating borehole contamination of the formation signal.

The invention has been described with reference to particular preferred embodiments, but variations within the spirit and scope of the invention will occur to those skilled in the art. For example, it will be understood that the method of the invention can be applied for other types of thermal decay tools and other types of pulse sequences.

The invention claimed is:

1. A method for determining thermal capture cross-sections of formations surrounding an earth borehole, comprising the steps of:
    transmitting, from a location in the borehole, bursts of neutrons into the formations;
    detecting, in the borehole, resultant gamma ray counts, and deriving a measurement spectrum from said gamma ray counts;
    deriving a forward model comprising a combination of model exponential components having respective model decay times and model amplitudes;
    deriving an error function that depends on comparison between said forward model and said measurement spectrum; and
    determining, by regularized inversion, optimized exponential components of said model that substantially minimize said error function;
    said optimized exponential components being indicative of the thermal capture cross-sections of the formations.

2. The method as defined by claim 1, wherein said optimized exponential components comprise optimized amplitudes for selected decay times.

3. The method as defined by claim 2, wherein said detecting of gamma ray counts comprises detecting counts within a number of time windows, and wherein the number of said model exponential components is substantially greater than said number of time windows.

4. The method as defined by claim 3, wherein said regularized inversion comprises an inversion with a penalty added to said error function for variation of said model amplitudes.

5. The method as defined by claim 4, wherein said penalty is proportional to the sum of squares of said model amplitudes.

6. The method as defined by claim 5, further comprising applying said penalty to said error function with a varying proportionality constant.

7. The method as defined by claim 2, wherein said regularized inversion comprises an inversion with a penalty added to said error function for variation of said model amplitudes.

8. The method as defined by claim 2, wherein said regularized inversion comprises a regularized least squares inversion with a penalty added to said error function for variation of said model amplitudes.

9. The method as defined by claim 2, further comprising performing singular value decomposition on said forward model before implementing a regularized inversion with a penalty added to said error function for variation of said model amplitudes.

10. The method as defined by claim 9, wherein said penalty is proportional to the sum of squares of said model amplitudes.

11. The method as defined by claim 10, further comprising applying said penalty to said error function with a varying proportionality constant.

12. The method as defined by claim 1, wherein said detecting of gamma ray counts comprises detecting counts within a number of time windows, and wherein the number of said model exponential components is substantially greater than said number of time windows.

13. The method as defined by claim 1, further comprising repeating said method at different locations in the borehole, and producing a log of determined capture cross-section values.

14. A method for determining thermal capture cross-sections of formations surrounding an earth borehole, comprising the steps of:
    providing a logging device that is moveable through the borehole;
    transmitting, from said logging device, bursts of neutrons into the formations;
    detecting, at the logging device, resultant gamma ray counts, and deriving a measurement spectrum from said gamma ray counts;

deriving a forward model comprising a combination of model exponential components having respective model decay times and model amplitudes;

deriving an error function that depends on comparison between said forward model and said measurement spectrum; and determining, by regularized inversion, optimized exponential components of said model that substantially minimize said error function;

said optimized exponential components being indicative of the thermal capture cross-sections of the formations.

15. The method as defined by claim 14, wherein said optimized exponential components comprise optimized amplitudes for selected decay times.

16. The method as defined by claim 15, wherein said detecting of gamma ray counts comprises detecting counts within a number of time windows, and wherein the number of said model exponential components is substantially greater than said number of time windows.

17. The method as defined by claim 16, wherein said regularized inversion comprises an inversion with a penalty added to said error function for variation of said model amplitudes.

18. The method as defined by claim 17, wherein said penalty is proportional to the sum of squares of said model amplitudes.

19. The method as defined by claim 18, further comprising applying said penalty to said error function with a varying proportionality constant.

20. The method as defined by claim 15, wherein said regularized inversion comprises an inversion with a penalty added to said error function for variation of said model amplitudes.

21. The method as defined by claim 20, wherein said regularized inversion comprises a regularized least squares inversion with a penalty added to said error function for variation of said model amplitudes.

22. The method as defined by claim 20, further comprising performing singular value decomposition on said forward model before implementing a regularized inversion with a penalty added to said error function for variation of said model amplitudes.

23. The method as defined by claim 14, further comprising repeating said method with said logging device at different depth levels in the borehole, and producing a log of determined capture cross-section values.

24. The method as defined by claim 23, wherein said logging device is a wireline logging device.

25. The method as defined by claim 23, wherein said logging device is a logging-while-drilling logging device.

26. For use in conjunction with a well logging technique for logging formations surrounding an earth borehole which includes providing a logging device that is moveable through the borehole transmitting, from the logging device, bursts of neutrons into the formations, and detecting, at the logging device, resultant gamma ray counts, and deriving a measurement spectrum from said gamma ray counts; a method for determining thermal capture cross-sections of the formations, comprising the steps of:

deriving a forward model comprising a combination of model exponential components having respective model decay times and model amplitudes;

deriving an error function that depends on comparison between said forward model and said measurement spectrum; and determining, by regularized inversion, optimized exponential components of said model that substantially minimize said error function;

said optimized exponential components being indicative of the thermal capture cross-sections of the formations.

27. The method as defined by claim 26, wherein said optimized exponential components comprise optimized amplitudes for selected decay times.

28. The method as defined by claim 27, wherein said detecting of gamma ray counts comprises detecting counts within a number of time windows, and wherein the number of said model exponential components is substantially greater than said number of time windows.

29. The method as defined by claim 27, wherein said regularized inversion comprises an inversion with a penalty added to said error function for variation of said model amplitudes.

30. The method as defined by claim 26, further comprising the step of extracting, from a distribution of the determined thermal capture cross sections, a formation peak.

* * * * *